United States Patent [19]
Walters

[11] 4,453,563
[45] Jun. 12, 1984

[54] NON-CHATTERING FLOAT CONTROLLED PILOT OPERATED DIAPHRAGM VALVE

[76] Inventor: William R. Walters, Cleveland, Okla.

[21] Appl. No.: 392,724

[22] Filed: Jun. 28, 1982

Related U.S. Application Data

[63] Continuation-in-part of Ser. No. 138,583, Apr. 8, 1980, Pat. No. 4,352,371.

[51] Int. Cl.³ ............... F16K 31/34; F16K 33/00
[52] U.S. Cl. ................... 137/414; 137/435; 137/436; 251/46; 251/121
[58] Field of Search ........... 137/414, 435, 436, 448, 137/451; 251/28, 45, 46, 120, 121, 61.1

[56] References Cited

U.S. PATENT DOCUMENTS

| | | | |
|---|---|---|---|
| 2,143,204 | 1/1939 | McCormack | 137/414 |
| 3,255,773 | 6/1966 | McQueen | 137/414 |
| 3,729,017 | 4/1973 | Brandelli | 137/414 |
| 3,760,839 | 9/1973 | Hyde | 137/414 |

FOREIGN PATENT DOCUMENTS

| | | | |
|---|---|---|---|
| 250018 | 8/1959 | Australia | 137/414 |
| 85711 | 6/1955 | Norway | 137/414 |
| 102794 | 10/1941 | Sweden | 137/414 |
| 12336 | of 1903 | United Kingdom | 137/414 |

*Primary Examiner*—George L. Walton
*Attorney, Agent, or Firm*—Head, Johnson & Stevenson

[57] ABSTRACT

A non-chattering, float-controlled, pilot-operated diaphragm valve for controlling the flow of liquids from a conduit under pressure to a tank where the surface is in turbulent condition. The lightweight float and pilot valve follow the relatively high frequency fluctuations of level and the diaphragm valve responds causing a rapid opening and closing of the main flow through the conduit into the tank. The chattering is eliminated by the insertion of operative means between the float closure means and the movable diaphragm. A small diameter rod of selected length is positioned between the diaphragm and the closure means so that when the main flow through the conduit starts, the movement of the diaphragm away from the conduit forces the pilot valve to open and submerge the float to a considerable depth. While the float rises, the pilot valve remains open permitting the main flow to continue, and raising the level in the tank a substantial amount so that there is a continuing pressure on the float to maintain a closed pilot. This prevent the immediate reopening of the conduit and therefore, removes the rapid chattering action.

3 Claims, 2 Drawing Figures

NON-CHATTERING FLOAT CONTROLLED PILOT OPERATED DIAPHRAGM VALVE

CROSS-REFERENCE TO RELATED APPLICATION

This application is related to and is a continuation-in-part of my co-pending application filed Apr. 8, 1980 entitled "Low-High Flow Rate Valve", Ser. No. 138,583 now U.S. Pat. No. 4,352,371.

BACKGROUND OF THE INVENTION

1. Field of the invention

This invention lies in the field of pilot controlled diaphragm valves. More particularly, it concerns applications of such valves where the liquid flow to a tank is controlled, and particularly, where the surface of the liquid in the tank is turbulent either due to wind or other causes.

2. Description of the Prior Art

In the prior art there are a number of examples of float-controlled pilot-operated diaphragm valves. They all operate on more or less the same principle that an input conduit is proved into a chamber where the chamber is closed with a movable wall or diaphragm. There is a second closed chamber on the opposite side of the diaphragm such that when the level of liquid in the second chamber reaches a selected height applying a selected unit pressure on the diaphragm, where the ratio of diaphragm area to input conduit area is such that the resultant force on the diaphragm is in the direction to move it toward the input conduit to close off the flow therefrom.

One of the advantages of this type of valve is that the float mechanism is substantially reduced in size and complexity, since it is subjected only to minor forces. However, when the liquid flows into an outdoor tank, for example, and where the liquid is water for drinking by cattle, the water surface is seldom tranquil, either because of the movement of the cattle in the water or because of wind or other conditions that generate a turbulence, comprising numerous low level waves that move back and forth across the area where the float is submerged.

If the float responds to these low waves, it can open and close the pilot valve at a fairly high frequency. If the response of the diaphragm is fast enough to follow the openings and closings of the pilot valve, then the main valve consequently opens and closes in response to the movement of the diaphragm. Under certain conditions of frequency and amplitude of the waves and turbulence, there can be a very rapid opening and closing of the main valve which causes a chattering which may be very damaging to the diaphragm and so on.

SUMMARY OF THE INVENTION

It is, therefore, a primary object of this invention to provide a float-controlled, pilot-operated, diaphragm valve for use under turbulent liquid conditions in the tank that will prevent chattering of the main valve.

This improvement can be added to any one of many types of diaphragm controlled valves. It's mode of operation comprises the insertion of some operative means between the float controlled closure means, and the movable diaphragm, the purpose of which is to reduce the responsiveness of the diaphragm to high frequency, or short time period, fluctuations of the surface of the liquid; and to increase the responsiveness of the diaphragm to long time period, low frequency fluctuations of the position of the closure means and the float.

In one embodiment a short small diameter rigid rod of selected length is positioned along the axis of the valve between the diaphragm and the closure means on the pilot valve, which is operated by the float. This can be called a mechanical compressive operative means or interconnection means.

Since there is generally axial symmetry between the diaphragm and the orifice through the diaphragm at its center, which is in coaxial alignment with a second orifice, as an outlet from the second chamber, the device can be conveniently constructed of a small diameter rod with smaller diameter extension pins on each end. The pins are inserted into the first orifice in the diaphragm and the other pin is inserted into the outlet second orifice. The length of the device is critical and must be adjusted to the physical dimensions of a particular valve.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENTS

Figure 1:
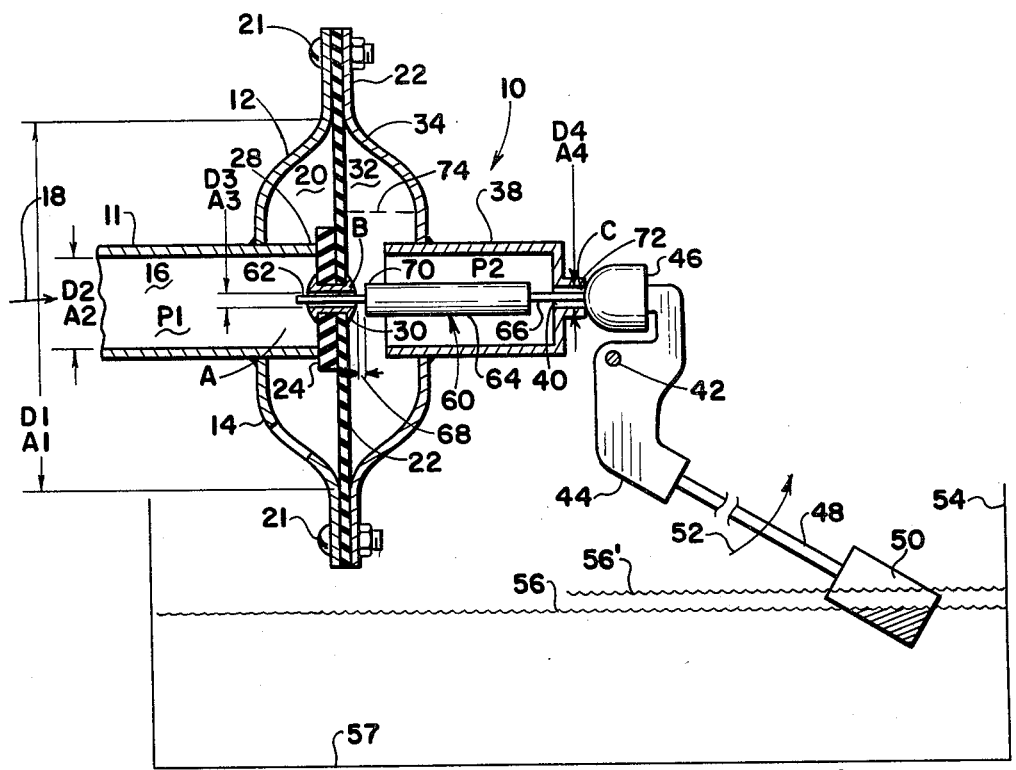
FIG. 1 represents a prior art type float-controlled pilot-operated diaphragm valve. It has been modified, however, to include an intermediate operating means for controlling the position of the closure means and float due to the movement of the diaphragm.

Referring now to the drawings and in particular to FIG. 1, there is shown a type of float controlled pilot operated diaphragm valve such as was illustrated in my co-pending application Ser. No. 138,583.

A supply of pressurized water (not shown) provides a float of water in accordance with arrow 18 into and through a pipe 11 which has a terminal opening 28 of diameter D2, or area A2. This pressure in the space 16 in the first pipe 11 is P1.

A circular flange 12 of considerably larger diameter D1, and corresponding area A1, surrounds the end 28 of pipe 11. A flexible diaphragm 22 of the same diameter as the flange 12 is sealed against the flange 12. The flexible diaphragm carries a closure plate 24 on the side facing the pipe 11, so that when a sufficient force is applied to the second side of the diaphragm in space 32, to press the closure plate 24 against the end 28 of the pipe 11, the flow can be shut off. A small orifice 30 is provided in the closure plate 24, and diaphragm 22 so that flow can go from space 16 in the pipe 11 through the first orifice 30 to the second side 32 of the diaphragm. The diameter of the first orifice is D3 and the area is correspondingly A3. This first small orifice can be conveniently drilled in a rivet 26 which holds the closure plate 24 to the diaphragm 22.

A second short pipe 38 is attached to a second flange 34 of equal size to the first flange 12, which is clamped against the second side of the flexible diaphragm to the first flange by means such as screws 21, or equivalent means, so as to seal the diaphragm between the two flanges. The space between the first flange 12 and the diaphragm is indicated by numeral 20, and this space is vented to the atmosphere by at least one opening 14. Thus, when flow is not shut off from pipe 11 by the closure plate 28, the flow from the pipe 11 will exit through the opening 14 into the tank. The tank is shown in dashed outline by numeral 54 having a base 57 and a water level 56. The space or volume of the chamber on the opposite side of the diaphragm 22 from the pipe 11 is indicated by numeral 32, and there is a pressure in the water in the space 32 indicated as P2.

A second small orifice 40 is provided on the end of the short pipe 38, which has a diameter D4 and an area A4. This is closed by means of a closure tip 46, which can be of elastomeric material, as is well known in the art. It is mounted on a hinged arm 44, which rotates about a pin or axis 42. The arm 44 has a long rod 48 carrying a float member 50 which is adjusted to rest on the water level 56; when the water level is at the proper value the float will be raised in accordance with arrow 52 and the tip 46 will be pressed against the second orifice 40 to close it off.

When the second orifice 40 is closed off, water still continues to flow through the first orifice 30 into the space 32 and will continue to flow until the pressure P2 in space 32 is equal to some value such that P2 times the area A1 of the diaphragm is equal to P1 times the area A2 of the end 28 of the pipe 11. Because the area A1 is many times larger than the area A2, it is clear that a pressure in the space 32 much lower than P1 will be sufficient to provide a closure force against the end 28, equal to that due to the pressure P1 in the first pipe 11 over the area A2.

The pressure in space 32 can be reduced, such as when the level 56 drops a small amount, the float will drop and the area of the second orifice 40 opens a small amount, and is, for example, equal to that of the first orifice 30.

When the float level drops down farther, and the second orifice 40 is fully open, if the area A4 of the second orifice is now larger than the first orifice area A3. The water level in space 32 will drop below the critical level 74, and the pressure will drop below the critical pressure which is required to hold the valve closed. In that case, there is not sufficient force holding the diaphragm against the opening 28 of the pipe 11, and the pressure P1 then forces a large rate of flow out of the opening 28, and out of the opening 14, into the tank 54. This will quickly bring the level of water 56 up to a point where the second orifice 40 closes and the level then builds up in space 32 to a value higher than 74, and the diaphragm then closes off flow through the pipe 11.

So far I have described those features in FIG. 1 which are similar to FIG. 1 of Ser. No. 138,583.

It will be clear from FIG. 1 that with an axial symmetry of the valve, the first small orifice 30 and the second small orifice 40 will be coaxial with each other and a mechanical interlock between the diaphragm 22 and the closure means 46 can be provided in the form of a small rigid cylinder indicated generally by the numeral 60. This comprises a cylindrical portion 64 preferably larger in diameter than the first and second small orifices 30 and 40. There are two small diameter pin-type extensions along the axis of the rod 64, these are labeled 62 and 66. They are small enough to be inserted into the first and second small orifices respectively, without effecting greatly the area of each of the two orifices. If this is critical, of course, the diameters of the orifices 30 and 40 can be increased to compensate for the space occupied by the pins 62 and 66, respectively. Thus, the float conditions are identical with the device 60 present, as they were before the insertion of this device.

The length of the device 60 between the inner end 70 of the rod 64, and the outer end 72 of the pin 66 is such that when the float closes the second orifice, and the pin 66 is in contact with the closure means 46, there will be a selected small space 68 between the end 70 of the rod and the diaphragm 22. Having this space, it is possible to close the closure 46 while the valve is still open; that is while the flow to the input conduit 11 continues through the open end 28.

Consider the condition where the level 56 in the tank 54 is low enough so that the float 50 will drop and the rotation of the float mechanism 44 about the pin 42 will pull the closure means 46 away from the second orifice 40.

Consider that the level of water in the second chamber 32 is at the level 74 indicated in FIG. 1, and that this level is at least slightly higher than the level necessary to close the diaphragm. When the second orifice opens, water leaks out of the space 32 through the second orifice 40 and this level 74 falls to a point where the pressure holding it against the pipe 11, or the opening 28 is not sufficient to overcome the force on the diaphragm due to the pressure P1 inside of the conduit 11. The pressure P1 will then force the diaphragm away from the opening 28 and a rush of water will flow out of the conduit 11 and the diaphragm will be pushed to the right more or less as shown schematically in FIG. 2. This motion of the diaphragm 22 to the right carries with it the rod 60 which then forces the closure means 46 due to the contact with the pin 66, to the right, thus submerging the float 50 to the point 50' where it is (say) completely submerged in the liquid.

Responsive to the greater float force on the closure means 46 due to the greater submersion than the float 50 will force the rod 60 back by pressing on the pin 66 and this will move the diaphragm 22 to the left, although it will not completely close the opening 28, so that water continues to flow into the tank while the float 50' is moving upwardly and acting to close the second orifice 40.

In the meantime, the orifice 40 has been opened and the liquid level in the chamber 32 has dropped so that the level 74 is low and a continual flow of liquid into the space through the orifice 30 is required before the valve will be closed due to the water pressure in the second chamber 32. Since the flow through the conduit 11 has been continuing, the liquid level 56 in the tank will have risen to some higher level 56' before the diaphragm closes the opening 28 and shuts off the flow. Under the conditions of the higher level 56' in the water tank, the submergence of the float is greater and thus the response of the float to minor variations in level due to the turbulence will not follow and, therefore, there will be some time before the level in the tank is reduced back to the point 56 where the float can respond to the surface fluctuations. After that, the sequence is repeated, however, in view of the use of this operative means between the diaphragm and the closure 46 there cannot be a long succession of rapid openings and closings of the valve as existed before the use of the mechanism 60.

Figure 2:
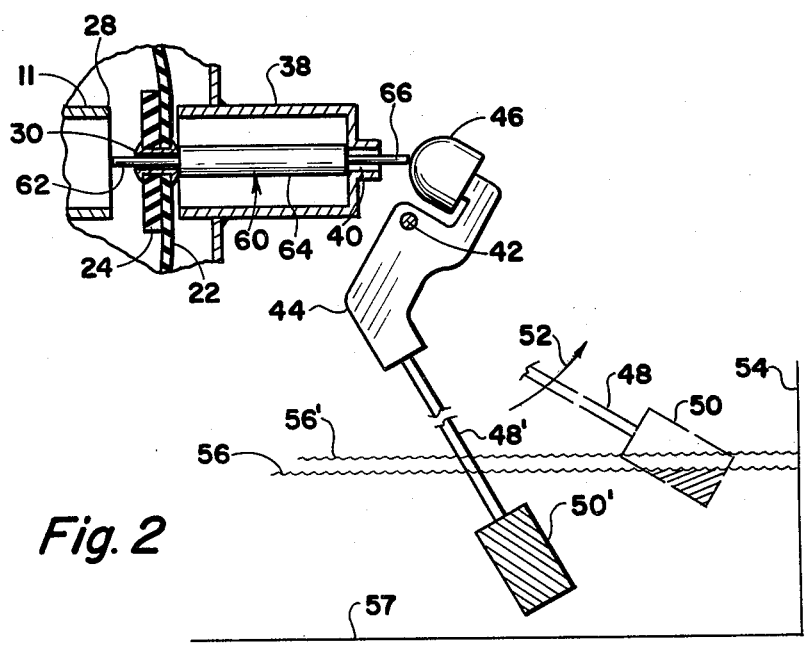
FIG. 2 illustrates the relative positions of the valve closure means and float when the valve is open.

I point out that it is the first rapid dynamic movement of the diaphragm, when the flow first starts, the causes the depression of the float as in FIG. 2. Sustained flow through the valve cannot hold the float down, otherwise the valve would never close. It is the first rush of water that depresses the float, and thus provides a delay before the pilot can close, to start building up pressure P2 in chamber 32, to close the valve 28. This delay provides an increase in tank level, leaving the float with a constant force holding the valve closed. It is only after this level drops back to 56 that the float can open the second orifice 40 to initiate reopening of the valve. Thus, rapid response of the diaphragm is slowed down, and chattering is prevented.

While I have showed one embodiment of my invention, and one mechanism applied to one type of valve, it can, of course, be applied in many other ways, to, in a sense apply a low pass filter between the float operated closure, and the diaphragm.

While I have described my invention in terms of a soft diaphragm type valve, any type of moving wall valve can, of course be used.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A float-controlled, pilot-operated, diaphragm valve for controlling the flow of a liquid from a conduit carrying said liquid under pressure, P1, to a tank subject to turbulent surface conditions, whereby the float is subject to rapid level changes;

the valve comprising;

(a) a housing divided into a first chamber and a second chamber by a movable wall; an opening in said first chamber;

(b) a first opening through which liquid under pressure P1 enters said first chamber; said wall adapted to move against said first opening to close it responsive to pressure P2, in said second chamber;

(c) a first small orifice in said wall;

(d) a second small orifice in the outer wall of said second chamber; said second orifice larger in area than said first orifice; closure means to close said second orifice, responsive to the level of a float;

the improvement in design to prevent chattering of said diaphragm valve in response to turbulence on the liquid surface; comprising;

(e) operative means inserted between said closure means and said movable wall to reduce the responsiveness of said wall to short time period fluctuations, and increase the responsiveness of said wall to long time period fluctuations of the position of said closure means and said float; and in which (f) said operative means comprises:

mechanical compressive interconnection means between said movable wall and said closure means;

whereby when the liquid surface lowers said valve diaphragm opens by said wall moving away from said first opening, said mechanical compressive interconnection means forces said closure means away from said second orifice when the diaphragm valve engages the interconnection means depressing said float deeper in the liquid and thus delaying the response to the turbulence on the liquid surface, and said interconnection means prevents chattering of the diaphragm valve as the float reaches the liquid surface and the closure means closes the second orifice.

2. The valve as in claim 1 in which said mechanical interconnection means comprises a short rod means, of length selectively less than the distance between said wall and said closure means when both are closed, said rod positioned between said wall and said closure means.

3. The valve as in claim 2 in which said first and second orifices are coaxial, and said rod means includes two axially projecting pins, one positioned, loosely fitting, in each of said two small orifices.

* * * * *